United States Patent [19]

Hutson

[11] Patent Number: 4,585,042

[45] Date of Patent: Apr. 29, 1986

[54] LOG DEBARKER

[76] Inventor: James H. Hutson, Rte. 4, P.O. Box 925, Pell City, Ala. 35125

[21] Appl. No.: 527,814

[22] Filed: Aug. 30, 1983

Related U.S. Application Data

[63] Continuation-in-part of Ser. No. 430,794, Sep. 30, 1982, Pat. No. 4,522,242.

[51] Int. Cl.[4] .................................................. B27L 1/00
[52] U.S. Cl. ................................ 144/208 E; 60/719; 91/514; 91/517; 198/781; 144/341; 226/4; 464/46; 464/48
[58] Field of Search ............ 144/208 R, 208 A, 208 E, 144/341; 60/97; 226/4; 91/414, 412, 413, 514, 451, 517; 198/781; 464/46, 47, 48

[56] References Cited

U.S. PATENT DOCUMENTS

| | | | |
|---|---|---|---|
| 700,845 | 5/1902 | Spencer. | |
| 2,270,943 | 1/1942 | Freundel et al. | 60/97 |
| 2,785,715 | 3/1957 | Brundell et al. | 144/247 |
| 2,788,034 | 4/1957 | Brundell et al. | 144/208 |
| 2,903,028 | 9/1959 | Brundell et al. | 144/208 |
| 3,221,785 | 12/1965 | Valo | 144/208 |
| 3,228,439 | 1/1966 | Jonsson et al. | 144/208 |
| 3,263,720 | 8/1966 | Brock et al. | 144/208 |
| 3,277,917 | 10/1966 | Stow | 137/98 |
| 3,490,665 | 1/1970 | Jonsson | 226/4 |
| 3,520,231 | 7/1970 | Genz | 91/414 |
| 3,523,564 | 8/1970 | Jonsson | 144/208 |
| 3,587,684 | 6/1971 | Bush, Jr. et al. | 144/208 |
| 3,664,472 | 5/1972 | Martini et al. | 192/12 R |
| 3,709,272 | 1/1973 | Bowers | 144/208 E |
| 3,774,660 | 11/1973 | Morey et al. | 144/208 F |
| 3,775,998 | 12/1973 | Century et al. | 64/30 D |
| 3,850,081 | 11/1974 | Joelson | 91/413 |
| 3,863,692 | 2/1975 | Hasada | 144/208 E |
| 3,955,473 | 5/1976 | Oxley et al. | 91/412 |
| 3,973,607 | 8/1976 | Jonsson | 144/208 E |
| 3,987,704 | 10/1976 | Johnson | 91/412 |
| 4,290,448 | 9/1981 | Budzich | 137/596.13 |
| 4,373,358 | 2/1983 | Pearch et al. | 464/48 |

Primary Examiner—W. D. Bray
Attorney, Agent, or Firm—Lalos, Keegan & Kaye

[57] ABSTRACT

A log debarker having a frame, a stator supported by the frame, a rotor journaled in the stator for rotation about a longitudinal axis of the rotor, a rotating mechanism for rotating the rotor about the longitudinal axis, a plurality of debarking tools attached to the rotor, and a feeding system for feeding logs axially through the rotor. The feeding system includes a plurality of log gripping rollers positioned for rolling contact with the log, and individual hydraulic motors are operatively connected to the log gripping roller for rotating the log gripping roller. Each of the hydraulic motors is adapted to rotate its log gripping roller at different and variable rotation speeds to accommodate logs of uneven surfaces. A hydraulic fluid supply system supplies each of the hydraulic motors with fluid so that the different and variable hydraulic fluid requirements of each of the hydraulic motors necessitated by uneven log surfaces are satisfied. A clutch mechanism operatively disposed between the roller and a roller drive shaft is positioned in and sealed in the roller. The debarking tools are mounted in a staggered fashion relative to an incoming log and are slanted in the direction of log travel.

36 Claims, 6 Drawing Figures

LOG DEBARKER

HISTORY OF THE APPLICATION

This application is a continuation-in-part of application Ser. No. 430,794, filed Sept. 30, 1982, now U.S. Pat. No. 4,522,242, the contents of which are hereby incorporated by reference in their entirety.

FIELD OF THE INVENTION

This invention relates to a log debarking machine through which logs are axially inserted and restrained against rotation as their bark is removed. It also relates to a means for retrofitting existing debarking machines to accommodate greater feed speeds and logs that are uneven in thickness due to knots or other protrusions. It should be noted that this log-feeding means can apply to other log-feeding means used in the processing of logs into finished or semi-finished products. It further relates to hydraulic systems for hydraulic motors that turn the log-gripping rollers for such log debarking machines. The present invention is also concerned with the design of the feed rolls for log debarking machines and the designs of the cutting tools or, more particularly, the mounting assemblies for the tools.

BACKGROUND OF THE INVENTION

This invention is an improvement to the hollow head log debarker disclosed in the parent application. Referring thereto, it is seen that hollow head type log debarkers generally include a frame, a stator supported by the frame, and a rotor journaled in the stator for rotation about a longitudinal axis of the rotor. A rotating means rotates the stator about that longitudinal axis rotating a plurality of debarking tools attached to the rotor. The debarking tools cut away the layer of bark of a log which is passed through the rotor along the longitudinal axis.

The debarker also includes, generally speaking, a feed means for feeding the logs through the rotor axially along the longitudinal axis. The feed means in the parent application includes an infeed means and an infeed end of the stator and an outfeed means positioned on the outfeed means. Both the infeed and outfeed means include a plurality of log-gripping rollers spacedly positioned about the circumference of the log. A power means is operatively connected to each one of the rollers for rotating the individual rollers at different and variable rotational speeds to accommodate logs of uneven surfaces.

In the parent application the infeed roll and a corresponding outfeed roll are connected in series via a hydraulic line. When the debarking tools get hung up on knots or other protrusions on logs, it is necessary to back the logs out. Of course, the quicker this can be done the more efficient and profitable the log debarking process is. The design of the parent application also allows for more poorly groomed logs to be debarked further increasing the machine's usefulness. However, no provision is made in the teachings of the parent invention effectively and quickly reversing the direction of the log without damaging the feeding shafts. Further, that design required the use of internally "sloppy" motors which were inefficient in their use of the hydraulic fluid.

In the prior art mechanical link-driven debarkers, is was known to provide individual "O" rings at the outer ends of the feed rolls to allow slippage between the outer spiked traction surface of the feed roll and its feed roll drive shaft when the rolls were traveling at different speeds. However, dust, woodchips, and other debris would get into the lubricating means of the "O" rings thereby jamming them. Users of them would frequently just weld them shut to prevent the jamming, and thereby preventing the slippage.

Problems have also been experienced in the log debarker cutting tools and their mounting assemblies. The cutting tool load experienced as the log impacted the tools was carried by jaws which were held in tension by bolts and these bolts could never be clamped tight enough. Also, the shock loading experienced by existing debarkers damages the debarker by breaking the feed roll shafts, spikes, and feed arm hubs. Further, the impact of the log against the outer end of the tools would damage the tools and the tool mounting assemblies.

OBJECTS OF THE INVENTION

Accordingly, it is the principal object of the present invention to provide an improved hollow head log debarking machine.

Another object of the present invention is to provide a novel log debarker with a greater feed speed.

A further object of the present invention is to provide a log debarker which accommodates logs that are not well groomed and have swelled butts, knots or other protrusions.

A still further object of the present invention is to provide an improved log debarker using power means which power the individual log-gripping rollers so that they can rotate at different and varying speeds.

Another object is to provide a novel hydraulic system for feeding hydraulic fluid to each of the hydraulic motors that rotate the log-gripping rollers.

A further object is to provide a novel hydraulic circuit which does not require that the hydraulic motors have internal relief means.

A still further object is to provide a novel tool mounting assembly which reduces the amount of shock loading to each of the hydraulic motors when a log first enters the debarking machine.

Another object is to provide a novel hydraulic system which provides power control pressure to each of the feed rolls.

A further object is to provide a means for insuring that hydraulic fluid always flows to each of the hydraulic motors.

A still further object is to provide a novel hydraulic circuit which reduces the amount of shock loading to each of the hydraulic motors.

Another object is to provide a hydraulic circuit which greatly reduces the total pressure required to turn the feed rolls and thereby reduces the amount of heat generated so that the system is more efficient.

A further object is to provide a circuit for controlling the flow of hydraulic fluid to the individual motors driving the individual feed rolls which permits an individual feed roll that encounters a knot or other log protrusion to speed up to accommodate the additional distance it must travel to traverse the protrusion.

Another object is to provide an improved hydraulic system for a log debarker which allows the direction of the feed means to be quickly reversed when the logs are jammed in the machine because the cutting tools encounter knots, butts or other protrusions without causing damage to the feed means.

A further object is to provide a clutch mechanism positioned between the outer spiked surface of the feed roll and the rotating feed roll drive shaft which will not be jammed by dust, woodchips and other debris.

A still further object is to provide a novel log debarker cutting tool which reduces the amount of damage to the tool and the tool mount and the shock loading to the system when a log first impacts the cutting tools.

Other objects and advantages of the present invention will become more apparent to those persons having ordinary skill in the art to which the present invention pertains from the foregoing description taken in conjunction with the accompanying drawings.

THE DRAWINGS

DESCRIPTION OF THE PREFERRED EMBODIMENT

Figure 1:
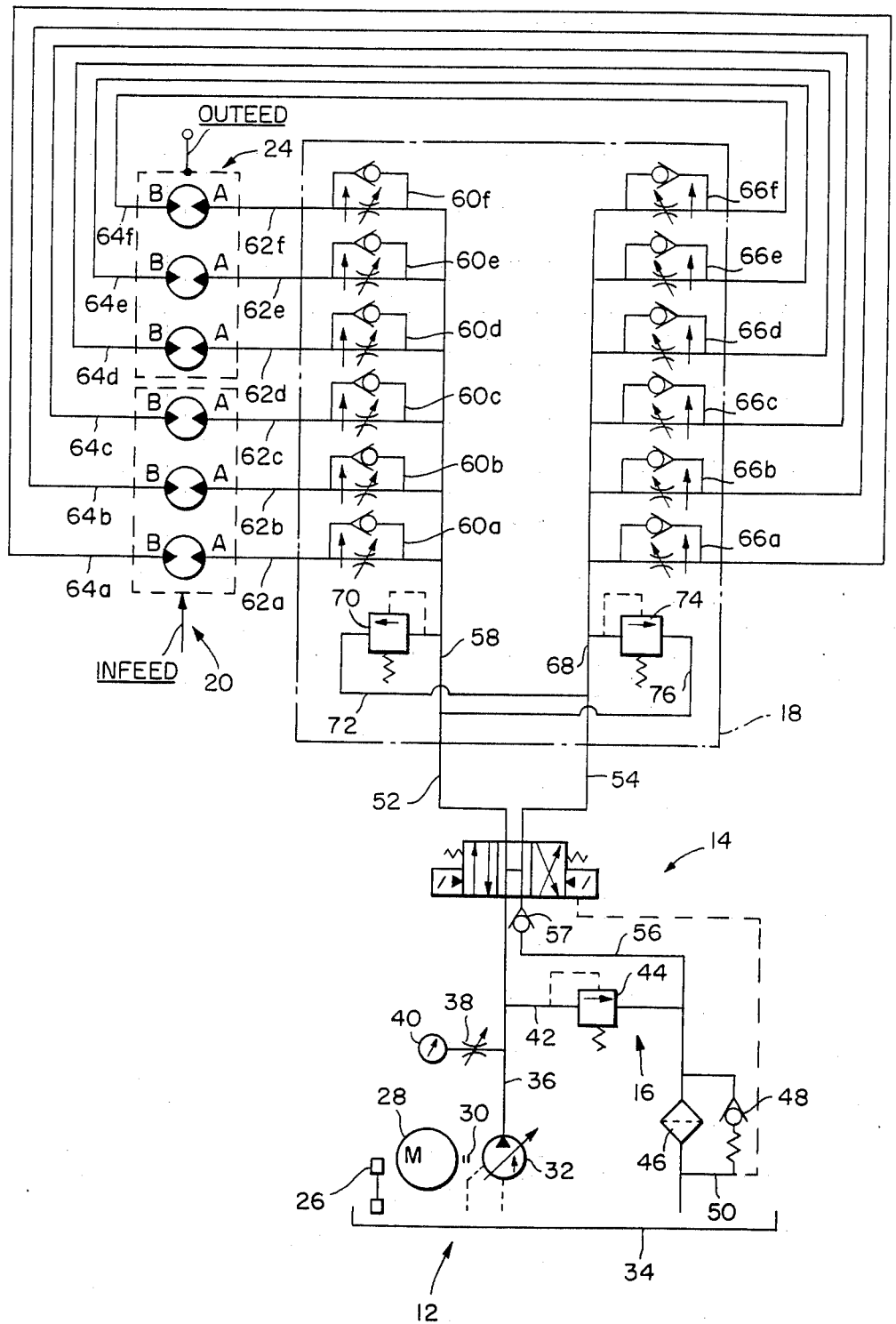
FIG. 1 is a schemactic view of the hydraulic circuit of the preferred embodiment of the present invention.

Referring to FIG. 1, the preferred hydraulic system powering the hydraulic motors which run the individual log-gripping feeding rollers is illustrated. Details of the log-gripping feeding rollers are found in the parent application. This system can be used to drive 18", 24" or 30" current models of debarkers or any other size or make machine that may adapt to these principles through field conversions. This system can be used on newly-manufactured hydraulic feed debarkers as well. Generally, the system is shown to comprise a pumping means shown generally at 12 pumping hydraulic fluid to a 4-way control valve means shown generally at 14. A pressure relief system shown generally at 16 is provided between the pumping means and the 4-way hydraulic valve means. The hydraulic fluid flows from the 4-way valve means to the control block shown generally at 18. Control block 18 regulates the flow of the hydraulic fluid to each of the infeed hydraulic motors shown generally at 20 and the outfeed hydraulic motors shown generally at 24.

Pumping means 12 generally includes a low-level cutoff switch 26 connected to an electric motor with a C flange 28 and with a coupling 30 which powers the pressure compensated or non-compensated variable pump pressure compensated or non-compensated variable pump 32 which pumps fluid from the tank 34 through a line 36 past the needle valve 38 and the pressure gauge 40 to 4-way valve 14. When the pressure exceeds a set pressure, the excess hydraulic fluid is diverted through a line 42 to the adjustable relief valve 44 and then to a return oil filter 46 which dumps in tank 34. Relief valve 44 will chop off the "spikes" in the oil pressure as control valve 14 shifts. When the fluid pressure differential exceeds the rating of the element in filter 46, the check valve with spring 48 is popped open and the excess fluid flows through line 50 directly to tank 34.

The 4-way control valve 14 is shown to be a properly sized double solenoid valve with an open center spool and a back pressure check valve. Another embodiment could utilize a single solenoid valve, a manual three-position valve or a manual two-position valve. Similar configurations of air pilot operated or hydraulically operated valves can also be utilized. The valve can be set so that the hydraulic fluid goes through line 52 to control block 18 for powering the hydraulic motors so that they turn in a direction whereby the logs are fed into the stator or through a second line 54 whereby the hydraulic fluid flows through control block 18 into the opposite ports of each of the infeed and outfeed motors 20 and 24, thereby causing the output shafts of the motor to rotate in the opposite directions. The respective log-gripping rollers are thereby rotated in the opposite direction so that the logs are driven through the stator in the opposite direction. When one line has been selected by the setting of the 4-way valve 14, the other line acts as a return from control block 18 to tank 34 by passing down line 56 to the return oil filter 46, as previously described, and then into tank 34. Spring-loaded check valve 57 on line 56 provides sufficient pressure within the 4-way valve to pilot the valve 14 on command.

Fluid flowing through line 58 flows to each of the hydraulic motors through their individual pressure compensated adjustable flow control valves with check valve, each shown generally at 60. Each of these flow control valves is individually set so as to insure that its respective hydraulic motor 20 or 24 receives the hydraulic fluid necessary to rotate at the desired speed. After passing through the flow control valves 60a, 60b, 60c, 60d, 60e or 60f, the fluid flows through lines 62a, 62b, 62c, 62d, 62e or 62f to the port side of its respective hydraulic motor as indicated at A. The hydraulic fluid after running the hydraulic motor passes out the motor at port B and flows through lines 64a, 64b, 64c, 64d, 64e or 64f back to the opposite side of the control block and through the check valves of each of the opposing pressure compensated adjustable flow control valves as indicated at 66a, 66b, 66c, 66d, 66e and 66f. It then flows through line 68 back through the 4-way control valve to the tank. It is thus seen that the present system puts power controlled pressure to each of the six feed rolls.

When the pressure in line 58 exceeds the setting of relief valve 70, fluid then flows through the crossover adjustable pressure relief valve shown at 70 and through line 72 back to the 4-way valve and the tank. A similar crossover adjustable pressure relief valve shown at 74 is provided for line 76 when the fluid is directed by the 4-way valve through line 68 to each of the pressure-compensated adjustable flow control valves 66.

Thus, it is noted that although the system of FIG. 1 requires no special internally-relieved motors or a positive six-way flow divider, a specially designed pressure compensated flow system must be provided.

ADJUSTMENT PROCEDURES FOR THE PREFERRED EMBODIMENT

The adjustment procedures required to receive proper performance from the pressure-compensated flow control of the hydraulic system of FIG. 1 on existing machines on which this type of control conversion is installed and on new hydraulic feed debarkers are as follows:

1. Plug both "A" and "B" ports on control valve 14, or cause flow to be prohibited to lines 52 and 54.
2. Adjust the volume control of the pump 32 so that full volume is reached.
3. Adjust the compensator screw to reduce pressure to its minimum level.
4. Check motor 28 for rotation and start the motor.
5. Open needle valve 38 so that gauge 40 can be read.
6. Adjust the pressure compensator on pump 32 until the pressure level exceeds the maximum operating pressure by about 300–500 PSI.
7. Set relief 44 so that it relieves at this setting pressure or above.
8. Reset the compensator screw at pump 32 down to the desired compensator pressure, typically 2400 PSI.
9. Shut motor 28 off and remove the plugs from ports "A" and "B" and reconnect the hoses, or provide means for permitting flow to lines 52 and/or 54.
10. Start motor 28 and shift valve 14 into forward speed, that is, to the appropriate ports of the infeed and outfeed motors through line 52.
11. Adjust the rpm of the first feed roll in forward speed by utilizing the adjusting mechanism of the pressure-compensated flow control valve 60 in control block 18. Follow the same procedure until all six (3 infeed and 3 outfeed) feed roll speeds are set. This rpm should be slightly higher than is required.
12. Reverse valve 14 so that oil will flow through line 54 through pressure-compensated flow control 68 of the control block 18. Follow the procedure set forth previously to set machine feed rolls in reverse on all six (3 infeed and 3 outfeed) machine feed rolls. The outfeed speed is not to exceed the infeed speed.
13. The crossover relief valves 70 and 74 in control block 18 are typically preset at the factory but should have an adjustment screw available should changes be required in the field.
14. After all six (3 infeed and 3 outfeed) machine feed rolls speeds have been set in both forward and reverse, one of the critical stages for setting the pressure of compensated feed control system is reached. One must return to the hydraulic pump 32 and look at gauge 40; the reading should be of the full compensated pressure, which, it is noted, is not the desired pressure for operation. To achieve the desired system pressure, the volume control lever is moved (reducing flow) until the pressure drops off sharply; the volume control device is moved further so that it reduces flow until the pressure on the gauge becomes stationary. This reading is the no-load pressure reading. This flow from the pump 32 is below the accumulated flow settings of the feed motors. Typically, this will be approximately 90% of the total accumulated flow settings of the PCFC valves. With all of the rolls in contact with a log, the synchronized speeds of the feed rolls will represent the feed speed of the machine.
15. All controls are then locked in this position, and the system of FIG. 1 is ready to operate.

OPERATION OF THE PREFERRED EMBODIMENT

Assuming that each of the six valves is set to take three gallons per minute, and the pump is set to pump only seventeen gallons per minute, the operation of the preferred embodiment is explained below. If all six feed rolls are on a smooth log, then each generally requires an equal volume of fluid. Although each is set to take a maximum of three gallons per minute, only seventeen gallons is available so each will theoretically use seventeen/sixths or two and five-sixths gallons. When one encounters a knot or other deformity on the log, the feed roll contacting the knot will have to travel a greater distance. Since the rolls are spiked and thus do not slip relative to the log and since the rolls do not generally move relative to one another with respect to a plane perpendicular to the axis of the log, that feed roll will have to speed up relative to the other feed rolls. The setting on the flow control permits it to take more oil (up to three gallons per minute). It should be noted though that when that feed roll does get more oil it means that there will be less oil for the remaining five feed roll motors. Thus, the log will slow down slightly, but this reduction in speed would not be readily perceptive to the eye. Thus, when one roll encounters a knot, the motors driving the other rolls try to cavitate the motor driving that roll, but there is no cavitation since each orifice flow control is set so that it can accommodate more oil than it is consuming.

Prior to a log entering the debarker, each of the motors is trying to run its full three gallons per minute but it cannot since only seventeen and not eighteen gallons are being supplied. When a log with an uneven end is fed into the debarker and one feed roll contacts the log end before the others, a work load is presented to that roll but not yet to the others. The oil would rather flow to the other five rolls—the path of least resistance—and it will but each is limited to three gallons. The two-gallon excess (seventeen minus fifteen) must then go through that one roll. The pressure will then rise to the extent necessary to rotate that roll on to the log, for example 1,000, 1,500 or 2,000 PSI. However, if it reaches a certain point, 2,400 PSI, for example, then the motor will stall. Assuming the stalling pressure has not been reached, that roll will cause the log to move further towards the debarker until the other rolls come into contact with the log. When the total load is being carried by all of the motors, the pressure accordingly drops down to load pressure.

It is thus seen that there are three principal advantages inherent in the present hydraulic system over that of the parent application. They are that (1) more efficient motors can be used; (2) a significantly lower pressure is required to advance the log through the machine and only the pressure required is provided as needed; and (3) it is possible to get instant control in reverse.

A SECOND EMBODIMENT

Figure 2:
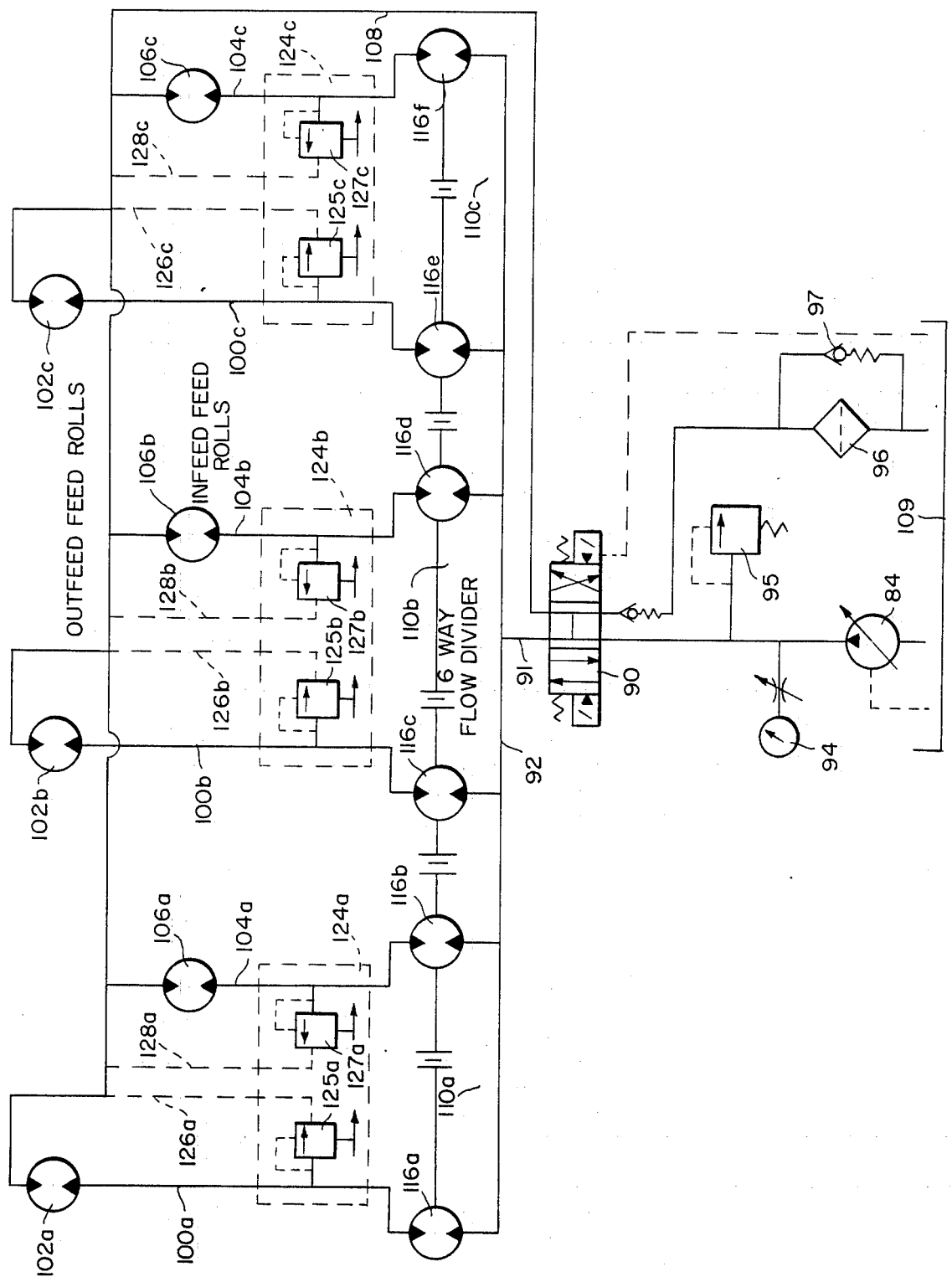
FIG. 2 is a schematic view of a hydraulic circuit of a second embodiment of the present invention.

Referring to FIG. 2, a second embodiment of the present invention is shown. Generally, it includes a similar pumping and pressure relief system as in FIG. 1, including pump 84 which pumps fluid through control valve 90 and then through line 91 to six-way flow divider means shown generally at 92. Suitable gauge 94, pressure relief control valve 95, and oil filter 96 with check valve 97 similar to that of FIG. 1 are also provided. The fluid then flows through lines 100a, 100b, and 100c to the outfeed motors 102a, 102b and 102c, respectively, and through lines 104a, 104b and 104c to the infeed motors 106a, 106b and 106c, respectively. After the fluid passes through the motors causing them to turn the feed rolls, it flows through line 108 through valve 90 then through filter 96 and to tank 109.

Six-way flow divider means 92 shown generally at 110a, 110b and 110c. Inasmuch as they are all integral and identical, only one portion (110a) will be described in detail. System 110a is understood to comprise two parallel hydraulic positive displacement flow dividers 116a and 116b. Flow divider compartments 116a, 116b, 116c, 116d, 116e and 116f are sized so that all will produce the same output volume. Flow divider compartment 116a feeds fluid through line 100a to its outfeed motor 102a and 116b feeds fluid through line 104a to its infeed motor 106a. Lines 100a and 104a both pass through a pressure relief control valve assembly shown at 124a, relief valves 125a and 127a in valve assembly 124a serve to relieve excess pressure in lines 100a and 104a respectively. Flow from these valves flows through lines 126a and 128a then through line 108, valve 90 and ultimately to tank 109.

A THIRD EMBODIMENT

Figure 3:
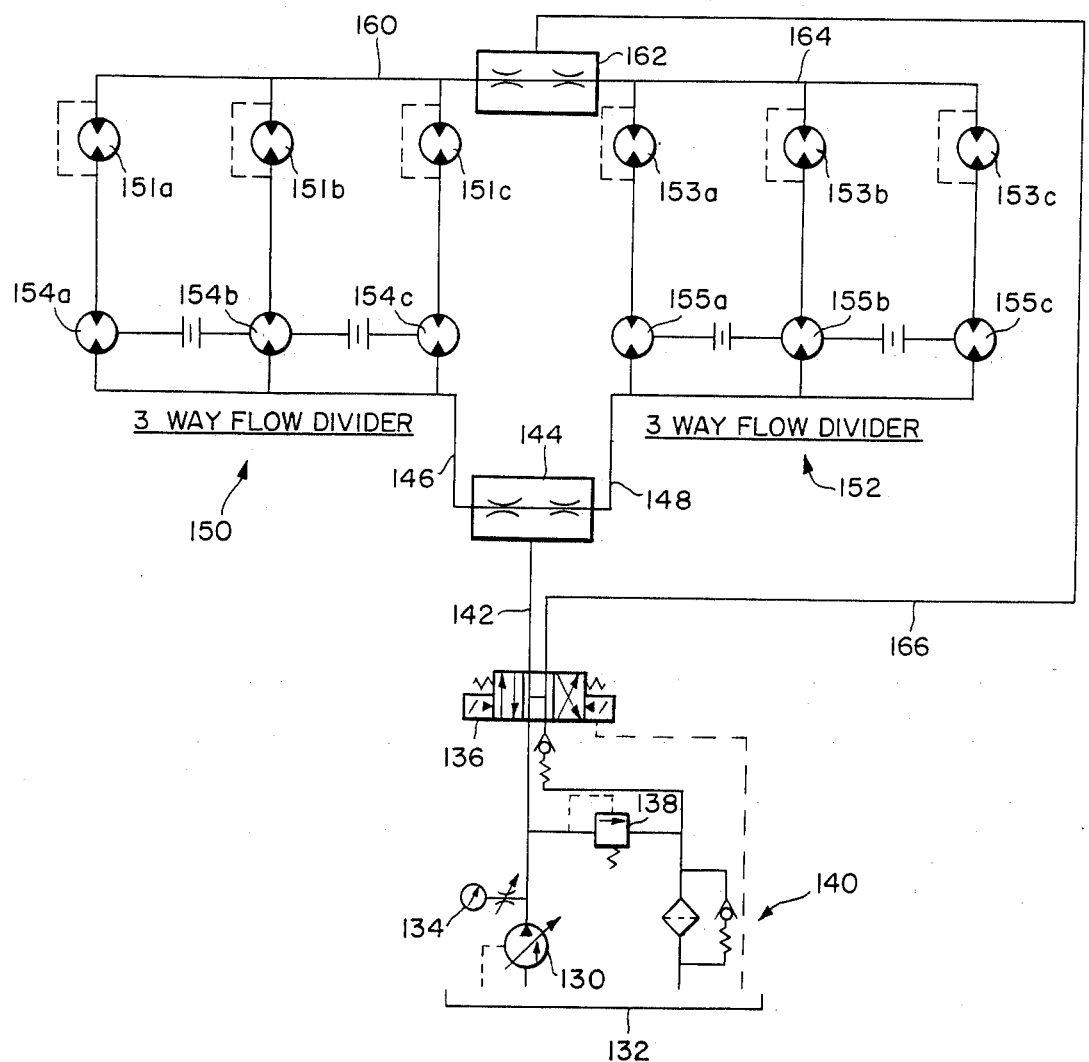
FIG. 3 is a schematic view of a hydraulic circuit of a third embodiment of the present invention.

Referring to FIG. 3, a third embodiment of the present invention is shown. Generally, it includes the same pumping and pressure relief systems as in FIG. 2, including pump 130, tank 132, needle-valve and pressure gauge 134, control valve 136, adjustable relief valve 138, and return oil filter with spring-loaded by-pass relief valve 140. Fluid flows from valve 136 through line 142 to an oil splitting device 144 which divides the fluid equally to lines 146 and 148. Line 146 then flows to a three-way flow divider shown generally at 150 to the infeed motors 151a, 151b and 151c and line 148 to a three-way flow divider shown generally at 152 and then to the outfeed motors 153a, 153b and 153c. Three-way flow divider 150 includes three positive displacement flow divider compartments with relief, 154a, 154b and 154c, each connected in parallel to its feed roll motor. Three-way positive displacement type divider compartments with relief 152 include 155a, 155b and 155c, each connected in parallel to its feed roll motor. As is shown in the top portion of FIG. 3, the fluid from each of the infeed motors passes through line 160 to oil splitting device 162 and similarly from the outfeed motors through line 164 to oil splitting device 162. The fluid then travels through line 166 to the four-way control valve and then to tank. Another embodiment could eliminate the need of splitting device 162.

FEED ROLL CONSTRUCTION

Figure 4:
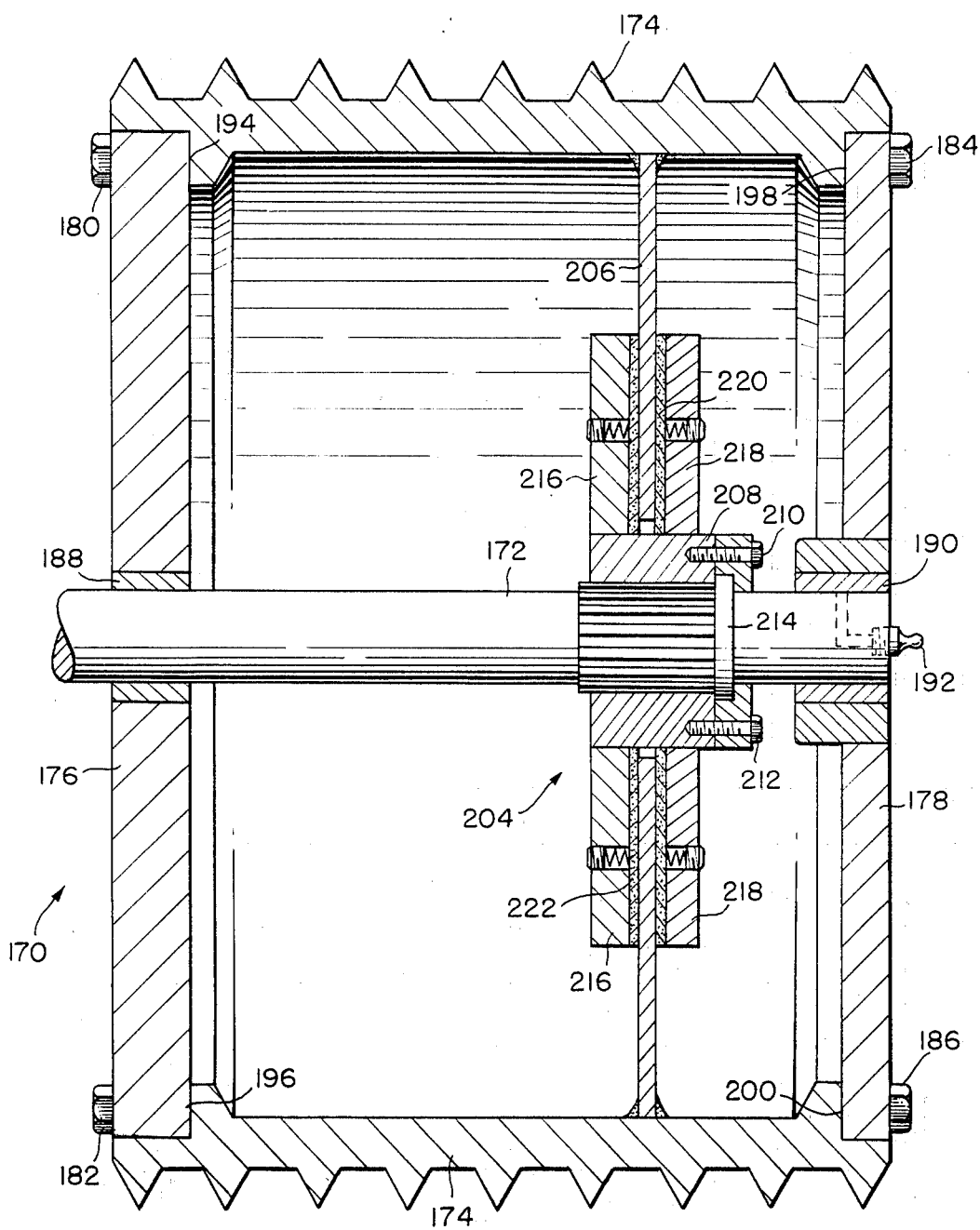
FIG. 4 is a cross-sectional view of a feed roll construction for a log debarker illustrating one aspect of the present invention.

The novel feed roll construction of the present invention is illustrated generally at 170 in FIG. 4. It is seen to comprise a drive shaft 172 driven by a motor (not shown). Cylindrical spiked roll 174 is positioned about drive shaft 172 and is held in place by inner and plate 176 and outer end plate 178. Inner end plate 176 is secured to spiked roll 174 by bolts 180 and 182 and outer end plate 178 is similarly secured by bolts 184 and 186. Drive shaft 172 is positioned through openings in the inner and outer end plates and a suitable gasket 188 is positioned at the inner end plate and a bronze gasket 190 with suitable great fitting 192 at the outer end plate are used to insure air tightness. Additional gaskets 194, 196, 198 and 200 are provided adjacent bolts 180, 182, 184 and 186, respectively, as well.

The clutch mechanism shown generally at 204 is positioned in the interior of this air-tight container formed by inner end plate 176, outer end plate 178, and spiked roll 174. The clutch mechanism is thus effectively sealed from woodchips, wood dust, dirt and other contaminants which have damaged prior mechanisms. Clutch mechanism 204 is shown to comprise a disc plate 206 welded to the inner surface of spiked roll 174. Disc plate 206 has a hole through which drive shaft 172 passes. Housing 208 is fixed to a splined portion of drive shaft 172 via bolts 210 and 212 and collar 214, which is mounted to the drive shaft. Parallel disc plates 216 and 218 mounted to housing 208 are positioned directly adjacent and on opposite sides of disc plate 206. A suitable adjustable pressure control shown generally at 220 and 222 is used to insure that under normal operating conditions disc plate 206 is firmly held between disc plates 216 and 218 so that spiked roll 174 rotates with drive shaft 172. However, when a certain resistance to rotation of spiked roll 174 is encountered, pressure control 220 and 222 allows for a certain slippage between disc plate 206 and disc plates 216 and 218 and thus between spiked roll 174 and drive shaft 172. Thus, the breaking of the drive shaft or other components previously experienced when the spiked roll was caught on a log is prevented.

CUTTING TOOL MOUNTING ASSEMBLY

Figure 6:
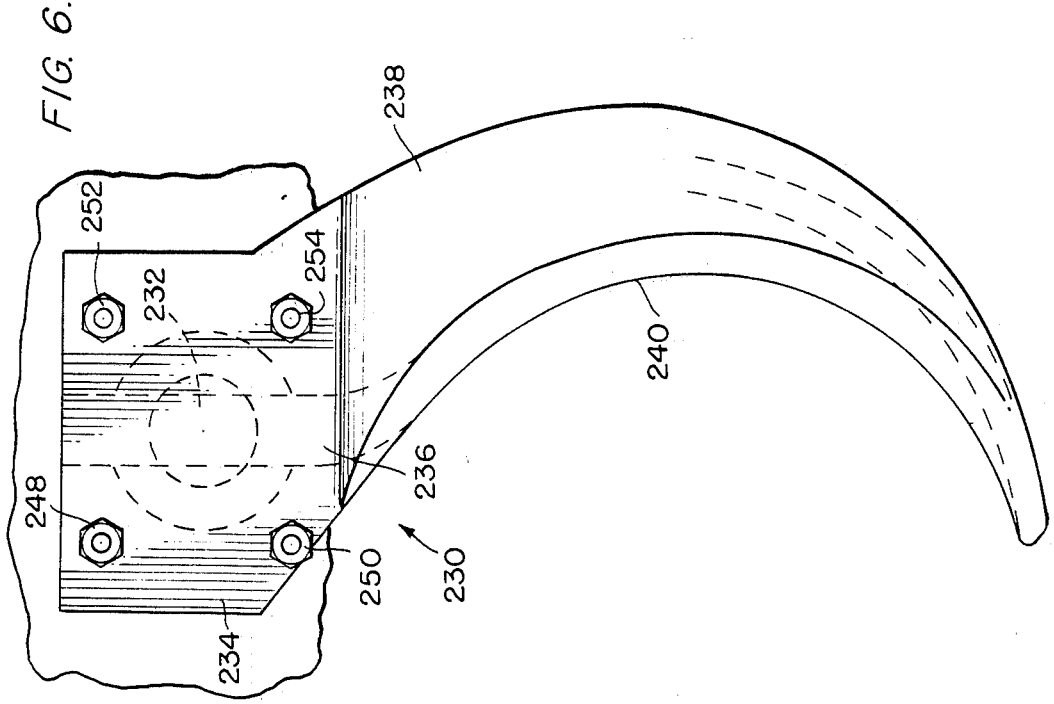
FIG. 6 is a front view of the tool mounting assembly of FIG. 5.
Figure 5:
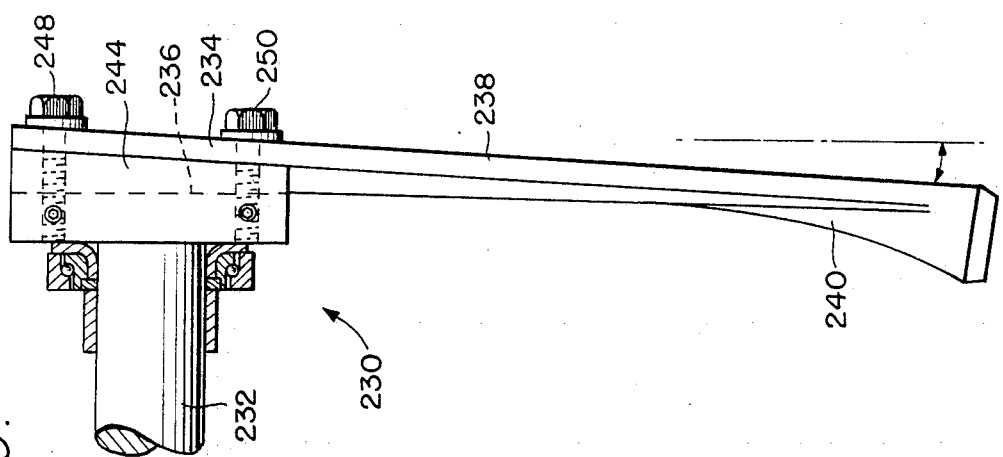
FIG. 5 is a side elevational view of a tool mounting assembly of the present invention, illustrated in isolation.

Referring to FIGS. 5 and 6, the tool mounting assembly is generally illustrated at 230. It includes a tool shaft 232 having a tool shaft head 234. An insert 236 is slotted into shaft head 234 into which the debarking tool is positioned. Debarking tool shown generally at 238 has a curved cutting portion 240, a head plate 242, and a key portion 244. Key portion 244 is fitted into insert 236 and the back side of head plate 242 is positioned against the outer surface 246 of shaft head 234. Four studs 248, 250, 252 and 254 are bolted through openings in head plate 242 and into tool shaft head 234 securing debarking tool 238 to tool shaft 232. Set screws, such as shown at 256 and 258 in FIG. 5, can be provided to lock the studs in place. The load against the tool is thereby carried in the key portion. As best shown in FIG. 5, outer surface 246 is machined to give a five-degree recess and the tool being generally straight and positioned flush against the outer surface will then be sloped five degrees relative to the tool shaft.

Extension washer 260 is positioned between bearing 262 and shaft head 234 on generally half of the tool mounting assemblies used in a debarker so that half of the tools extend a slight distance farther toward the incoming log than the remaining tools. Since fewer tools initially are rammed against the log the shock loading to the system is reduced.

Also, in the past, the tools were generally mounted in a plane perpendicular to the incoming log so that the log would typically initially contact the lead edge of the tool throughout its entire length. Inasmuch as this created a long moment arm—from the outer end of the tool to the tool shaft—the tool assemblies frequently broke. As previously discussed, the present invention mounts the cutting tools at an angle, e.g. five degrees, angling in the direction of log travel. Thus, the log initially contacts the tool at a location on the tool closer to the tool shaft than if the tool were mounted perpendicular as was done in the past. The moment arm is accordingly reduced and the likelihood that the tool breaks is reduced markedly.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A log debarker comprising:
   a frame,
   a stator supported by said frame,
   a rotor journaled in said stator for rotation about a longitudinal axis of said rotor,
   a plurality of debarking tools attached to said rotor,
   a feeding means for feeding logs axially through said rotor and including a plurality of log-gripping roller means positioned for rolling contact with the logs,
   each said log-gripping roller means including a log-gripping roller and a hydraulic motor operatively connected to said log-gripping roller for rotating said log-gripping roller, each said hydraulic motor being adapted to rotate its said log-gripping roller at different and variable rotational speeds to accommodate logs of uneven surfaces,
   a supplying means for supplying hydraulic fluid to each said hydraulic motor so that the different and variable hydraulic fluid requirements of each said hydraulic motor necessitated by uneven log surfaces are satisfied,
   said supplying means including separate flow control means connected to each said motor.

2. The log debarker of claim 1 including:
   each said flow control means comprising a pressure-compensated, adjustable flow control valve and a check valve.

3. The log debarker of claim 1 including:
   a pumping means for pumping hydraulic fluid to each said hydraulic motor,
   said supplying means including a pressure relief means, and
   said pumping means pumping fluid contiguous to said pressure relief means to each said flow control means.

4. The log debarker of claim 1 including:
   said supplying means including a means for insuring that hydraulic fluid always flows to each said hydraulic motor.

5. The log debarker of claim 1 including:
   said supplying means including a means for using hydraulic pressure only when said hydraulic motor requires pressure.

6. The log debarker of claim 1 including:
   said supplying means including a pumping means for pumping hydraulic fluid to each said hydraulic motor.

7. The log debarker of claim 6 including:
   said pumping means being a pressure-compensated adjustable flow pumping means.

8. The log debarker of claim 1 including:
   said supplying means including a setting means for setting the fluid flow to each said hydraulic motor so that each said log-gripping roller rotates at the same speed when in a no-load pressure condition.

9. The log debarker of claim 1 including:
   said supplying means including a reversing means for reversing the direction of fluid flow through each said hydraulic motor thereby reversing the direction that each said log-gripping roller is rotated.

10. The log debarker of claim 9 including:
    said reversing means including individual flow control means for controlling the flow of fluid in the opposite direction through each said motor.

11. The log debarker of claim 9 including:
    said reversing means including a valve means operatively disposed between said pumping means and said hydraulic motors.

12. The log debarker of claim 11 including:
    said valve means comprising a double solenoid valve with relief.

13. A log debarker comprising:
    a frame,
    a stator supported by said frame,
    a rotor journaled in said stator for rotation about a longitudinal axis,
    a plurality of debarking tools attached to said rotor,
    a feeding means for feedng logs axially through said rotor and including a plurality of log-gripping roller means positioned for rolling contact with the logs,
    each said log-gripping roller means including a log-gripping roller and a hydraulic motor and operatively connected to said log-gripping roller for rotating said log-gripping roller, each said hydraulic motor being adapted to rotate its said log-gripping roller at different and variable rotational speeds to accommodate logs of uneven surfaces,
    a reversing means for reversing the direction said feeding means feeds the logs through said rotor,
    said reversing means including a flow reversing means for reversing the flow of hydraulic fluid through each said hydraulic motor, and
    a supplying means for supplying hydraulic fluid to each said hydraulic motor and supplying the same general fluid pressure to each said hydraulic motor when said feeding means is operating in either direction.

14. A log debarker comprising:
    a frame,
    a stator supported by said frame,
    a rotor journaled in said stator for rotation about a longitudinal axis of said rotor,
    a rotating means for rotating said rotor about said longitudinal axis,
    a plurality of debarking tools attached to said rotor,
    a feeding means for feeding logs axially through said rotor and including a plurality of log-gripping roller means positioned for rolling contact with the logs,
    each said log-gripping roller means including a log-gripping roller and a hydraulic motor operatively connected to said log-gripping roller for rotating said log-gripping roller, each said hydraulic motor being adapted to rotate its said log-gripping roller at different and variable rotational speeds to accommodate logs of uneven surfaces,
    a pumping means for pumping hydraulic fluid to said hydraulic motors, and
    a dividing means for dividing the flow of hydraulic fluid in generally equal flows to each said hydraulic motor,
    said plurality of log-gripping roller means including three infeed log-gripping roller means positioned on the infeed side of said stator and three outfeed log-gripping roller means positioned on the outfeed side of said stator,
    said dividing means including a six-way flow divider means for dividing flow to each said infeed log-gripping roller means and each said outfeed log-gripping roller means.

15. The log debarker of claim 14 including:

said six-way flow divider means including an oil splitting device and a pair of three-way flow dividers, and said oil splitting device splitting fluid pumped by said pumping means equally to each said three-way flow divider.

16. The log debarker of claim 14 including:
each said hydraulic motor having internal pressure relief capabilities.

17. The log debarker of claim 14 including:
a pressure relief means operatively positioned between said pumping means and said dividing means.

18. An apparatus for moving, along their axes, items having protrusions on their circumference comprising:
a frame,
a plurality of feed roll means supported by said frame and spaced to engage said items at different points about their circumference,
a plurality of hydraulic motors, each said hydraulic motor being drivingly connected to a different said feed roll means, and
a hydraulic fluid supplying means for supplying hydraulic fluid to said hydraulic motors,
said hydraulic fluid supplying means including an increasing means for automatically increasing the flow of hydraulic fluid, when one said feed roll means encounters a protrusion on the surface of said item, to said hydraulic motor that is drivingly connected to said one feed roll means.

19. The apparatus of claim 18 including:
said hydraulic fluid supplying means including a single pumping means for pumping hydraulic fluid to all said hydraulic motors.

20. The apparatus of claim 18 including:
said hydraulic fluid supplying means including a valve means for individually setting the maximum volume of hydraulic fluid flow to each said hydraulic motor.

21. The apparatus of claim 20 including:
said hydraulic fluid supplying means supplying a set volume of hydraulic fluid to all said hydraulic motors which is less than the aggregate maximum volumes set by said valve means for all said hydraulic motors.

22. The apparatus of claim 20 including:
said hydraulic fluid supplying means supplying a set volume of hydraulic fluid to all said hydraulic motors which is greater than the aggregate maximum volumes set by said valve means for all but one said hydraulic motors.

23. The apparatus of claim 21 including:
said hydraulic fluid supplying means supplying a set volume of hydraulic fluid to all said hydraulic motors which is greater than the aggregate maximum volumes set by said valve means for all but one said hydraulic motor.

24. The apparatus of claim 18 including:
said hydraulic fluid supplying means including a reversing means for reversing the flow of hydraulic fluid through each said hydraulic motor and thereby reversing the direction of rotation of each said feed roll means.

25. The log debarker of claim 6 including:
said pumping means including a positive displacement, adjustable volume pumping means.

26. The log debarker of claim 11 including:
said valve means including a single solenoid valve.

27. The log debarker of claim 11 including:
said valve means including a manual three position valve.

28. The log debarker of claim 11 including:
said valve means including a manual two-position valve.

29. The log debarker of claim 11 including:
said valve means comprising an air pilot operated valve means.

30. The log debarker of claim 11 including:
said valve means comprising a hydraulically operated valve means.

31. A log debarker comprising:
a frame,
a stator supported by said frame,
a rotor journaled in said stator for rotation about a longitudinal axis of said rotor,
a plurality of debarking tools attached to said rotatable rotor,
a feeding means for feeding logs axially through said rotor and including a plurality of log-gripping roller means positioned for rolling contact with the logs,
each said log-gripping roller means including a log-gripping roller and a hydraulic motor operatively connected to said log-gripping roller for rotating said log-gripping roller,
each said hydraulic motor being adapted to rotate its said log-gripping roller at different and variable rotational speeds to accommodate logs of uneven surfaces,
a supplying means for supplying hydraulic fluid to each said hydraulic motor so that the different and variable hydraulic fluid requirements of each said hydraulic motor necessitated by uneven log surfaces are satisfied, and
said supplying means including a means for insuring that hydraulic fluid always flows to each said hydraulic motor.

32. A log debarker comprising:
a frame,
a stator supported by said frame,
a rotor journaled in said stator for rotation about a longitudinal axis of said rotor,
a plurality of debarking tools attached to said rotatable rotor,
a feeding means for feeding logs axially through said rotor and including a plurality of log-gripping roller means positioned for rolling contact with the logs,
each said log-gripping roller means including a log-gripping roller and a hydraulic motor operatively connected to said log-gripping roller for rotating said log-gripping roller,
each said hydraulic motor being adapted to rotate its said log-gripping roller at different and variable rotational speeds to accommodate logs of uneven surfaces,
a supplying means for supplying hydraulic fluid to each said hydraulic motor so that the different and variable hydraulic fluid requirements of each said hydraulic motor necessitated by uneven log surfaces are satisfied, and
said supplying means including a means for using hydraulic pressure only when said hydraulic motor requires pressure.

33. A log debarker comprising:
a frame, a stator supported by said frame,
a rotor journaled in said stator for rotation about a longitudinal axis of said rotor,
a plurality of debarking tools attached to said rotatable rotor,
a feeding means for feeding logs axially through said rotor and including a plurality of log-gripping roller means positioned for rolling contact with the logs,
each said log-gripping roller means including a log-gripping roller and a hydraulic motor operatively connected to said log-gripping roller for rotating said log-gripping roller,
each said hydraulic motor being adapted to rotate its said log-gripping roller at different and variable rotational speeds to accommodate logs of uneven surfaces,
a supplying means for supplying hydraulic fluid to each said hydraulic motor so that the different and variable hydraulic fluid requirements of each said hydraulic motor necessitated by uneven log surfaces are satisfied, and
said supplying means including a setting means for setting the fluid flow to each said hydraulic motor so that each said log-gripping roller rotates at the same speed when in a no-load pressure condition.

34. A log debarker comprising:
a frame,
a stator supported by said frame,
a rotor journaled in said stator for rotation about a longitudinal axis of said rotor,
a plurality of debarking tools attached to said rotatable rotor,
a feeding means for feeding logs axially through said rotor and including a plurality of log-gripping roller means positioned for rolling contact with the logs,
each said log-gripping roller means including a log-gripping roller and a hydraulic motor operatively connected to said log-gripping roller for rotating said log-gripping roller,
each said hydraulic motor being adapted to rotate its said log-gripping roller at different and variable rotational speeds to accommodate logs of uneven surfaces,
a supplying means for supplying hydraulic fluid to each said hydraulic motor so that the different and variable hydraulic fluid requirements of each said hydraulic motor necessitated by uneven log surfaces are satisfied,
said supplying means including a reversing means for reversing the direction of fluid flow through each said hydraulic motor thereby reversing the direction that each said log-gripping roller is rotated, and
said reversing means including individual flow control means for controlling the flow of fluid in the opposite direction through each said hydraulic motor.

35. The log debarker of claim 34 including:
said reversing means including a valve means operatively disposed between said pumping means and said hydraulic motors.

36. The log debarker of claim 34 including:
said valve means comprising a double solenoid valve with relief.